INVENTOR.
THOMAS M. CORRY
BY C. R. Meland
HIS ATTORNEY

June 23, 1970     T. M. CORRY     3,517,299
PULSE SHAPING CIRCUIT

Original Filed May 20, 1965     4 Sheets-Sheet 3

INPUT SIGNAL

OUTPUT VOLTAGE PULSES

INVENTOR.
THOMAS M. CORRY
BY C. R. Meland
HIS ATTORNEY

INVENTOR.
THOMAS M. CORR
BY C. R. Meland
HIS ATTORNEY

United States Patent Office 3,517,299
Patented June 23, 1970

3,517,299
PULSE SHAPING CIRCUIT
Thomas M. Corry, Goleta, Calif., assignor to General Motors Corporation, Detroit, Mich., a corporation of Delaware
Original application May 20, 1965, Ser. No. 457,329, now Patent No. 3,413,493, dated Nov. 26, 1968. Divided and this application Aug. 14, 1968, Ser. No. 752,533.
Int. Cl. H02m 7/44
U.S. Cl. 321—45                                    3 Claims

ABSTRACT OF THE DISCLOSURE

This invention relates to an electrical control circuit for translating the speed of a rotating shaft into an electrical signal the output frequency of which is a function of the speed of rotation of the shaft. The control circuit includes a pair of transistors connected in a push-pull network and these transistors are connected with the output winding of an alternating current generator which is driven by the shaft. The transistors feed a transformer having a primary winding and a plurality of secondary windings and a square wave voltage is iduced in the secondary windings when the input of the control circuit is fed by the alternating current generator. A feedback circuit is provided between one of the secondary windings and the input of the electrical control circuit. The control circuit is adapted for use in controlling the output frequency of an inverter which feeds an induction motor.

---

This application is a division of copending application Ser. No. 457,329, filed on May 20, 1965, now Pat. No. 3,413,493.

This invention relates to a power supply system for an electric motor where the electric motor is fed from a source of direct current by means of an inverter.

One of the objects of this invention is to provide a motor power supply system that includes an inverter and which includes an improved signal pick-up, pulse shaper and controlled rectifier driver circuit for the controlled rectifiers of the inverter.

Another object of this invention is to provide an electric circuit which is capable of translating shaft position into a plurality of electrical signals and where the output frequency of the electric circuit depends upon the frequency of rotation of the shaft.

Still another object of this invention is to provide an improved trigger circuit for triggering controlled rectifiers which is capable of applying extremely fast rise current pulses to the gate of the controlled rectifier. This circuit is useful in motor control systems where the motor is supplied through a controlled rectifier inverter.

Still another object of this invention is to provide a fast rise trigger, latching and reverse bias circuit for a controlled rectifier inverter. In carrying this object forward, the inverter may be used to supply a three-phase induction motor and the circuit is arranged such that the controlled rectifier is maintained in a conductive condition by a latching circuit over a predetermined conduction angle. This is important where the inverter is fed from a source of direct current through a modulator of a pulse type since where the inverter is fed by pulses of direct current, there is the possibility of a controlled rectifier turning off when the direct current goes to zero and the latching circuit of this invention prevents this by holding the controlled rectifier on for the required conduction angle.

Still another object of this invention is to provide a controlled rectifier inverter which includes power controlled rectifiers and shut-off controlled rectifiers and where the power supply and shut-off controlled rectifiers have triggering signals applied to them from fast rise trigger circuits.

A further object of this invention is to provide an electrical system where the load is powered by an inverter and where the inverter includes power and shut-off controlled rectifiers and further where the power controlled rectifiers are triggered by a fast rise trigger latching and reverse bias circuit. With this arrangement, the controlled rectifier inverter is capable of supplying voltage pulses of predetermined angles to an electrical load even though the inverter is fed from a source of direct current through a pulse modulator.

Further objects and advantages of the present invention will be apparent from the following description, reference being had to the accompanying drawings wherein preferred embodiments of the present invention are clearly shown.

Figure 1:
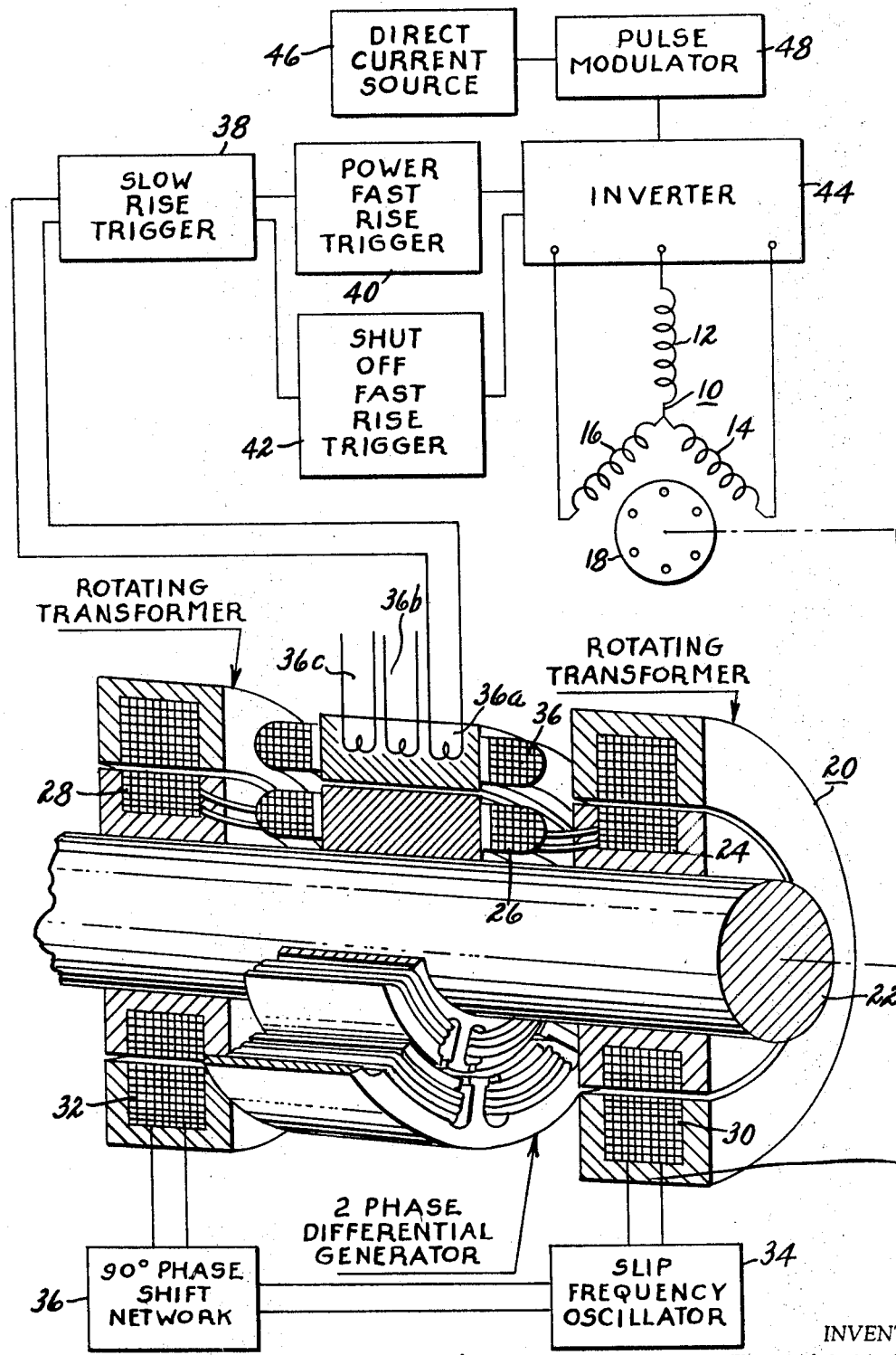
FIG. 1 is a schematic circuit diagram of a motor control system made in accordance with this invention and illustrating in block diagram form the various circuits that make up the total electrical system.

Referring now to the drawings and more particularly to FIG. 1, an electrical system is disclosed in block diagram form for feeding a three-phase induction motor generally designated by reference numeral 10. This motor includes a three-phase Y-connected stator winding formed of phase windings 12, 14 and 16. The motor has a squirrel cage rotor 18 which is used to drive some device such as a motor vehicle. The motor drives a control device generally designated by reference numeral 20 and having a shaft 22 coupled with the motor shaft. The shaft 22 carries windings 24, 26 and 28 the winding 26 being electrically connected with windings 24 and 28. The windings 24 and 28 rotate within fixed winding 30 and 32. The winding 30 is fed by a slip frequency oscillator 34 while the winding 32 is fed from the same slip frequency oscillator through a 90° phase shift network 36. The slip frequency oscillator can take various forms and supplies an input signal to windings 30 and 32 of a predetermined frequency. It is important that the frequency of the signal that is supplied to windings 30 and 32 be adjustable since it is possible to adjust the slip of the motor control system by adjustng the output frequency of the oscillator 34.

The winding 26 rotates within a winding 36 which includes three windings located 120 electrical degrees from each other. For convenience of illustration, the winding 36 is illustrated schematically as windings 36a, 36b and 36c, it being understood that the voltages induced in these windings are 120° out of phase.

It will be appreciated that the control device 20 will produce an output signal in the output windings 36a through 36c, the frequency of which is a summation of shaft speed and the output frequency of the slip frequency oscillator 34. Thus if the shaft speed has a frequency $F_a$ and the output frequency for the slip frequency oscillator is $F_b$, the frequency produced in each of the windings 36a through 36b will be $F_a$ plus $F_b$. The control device 20 may be thought of as a two phase differential generator having a two phase winding 26 and where a three phase output is taken from the windings 36a through 36b. The voltage developed in any given output winding is an alternating voltage the frequency of which is a summation of shaft speed and the output frequency of the slip frequency oscillator.

The windings 36a through 36c are each connected with a slow rise trigger circuit, one of which is illustrated in FIG. 1 and designated by reference numeral 38. It will be appreciated that three slow rise trigger circuits are required but for convenience of illustration, only one slow rise trigger circuit is illustrated.

The slow rise circuit 38 feeds a power fast rise trigger circuit 40 and a shut-off fast rise trigger circuit 42. The trigger circuits 40 and 42 control a controlled rectifier inverter 44 which controls the application of power to the phase windings 12, 14 and 16 of the induction motor 10. The inverter 44 is fed from a source of direct current 46 through a pulse modulator 48 that is capable of supplying unidirectional variable width square wave pulses to the inverter.

Figure 2:
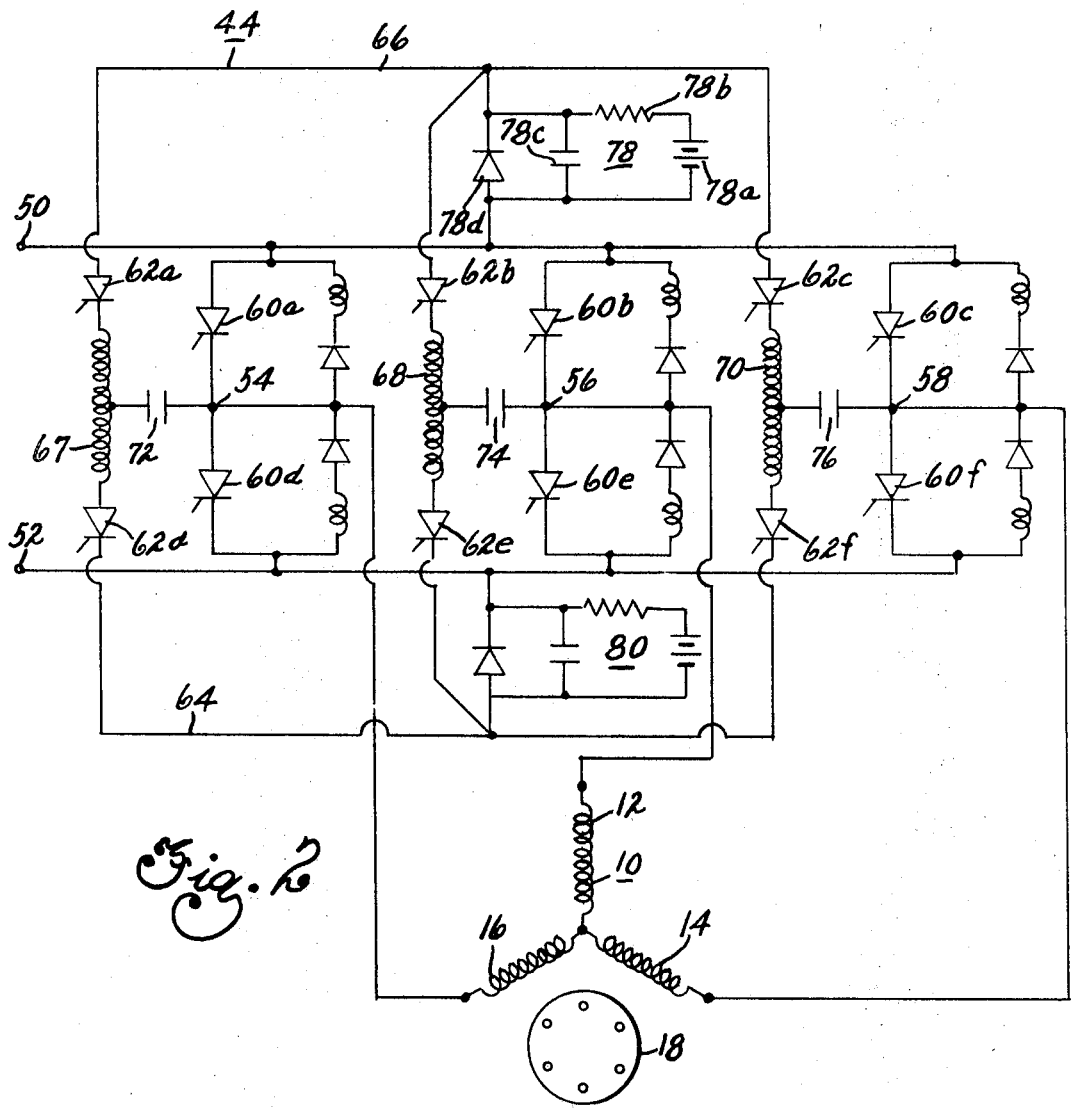
FIG. 2 is a schematic circuit diagram of an inverter for supplying an electrical load such as a three phase motor.

Referring now more particularly to FIG. 2, a schematic circuit diagram of the inverter 44 is illustrated. This inverter has a pair of input terminals 50 and 52 whch are fed by the pulse modulator 48. The modulator 48 can be of a type disclosed in patent application Ser. No. 457,374, filed on May 20, 1965 and now abandoned. Thus, the input terminals 50 and 52 will be supplied with pulsating direct current of a value determined by the pulse modulator 48. The inverter 44 has output terminals 54, 56 and 58. These output terminals are connected respectively with the three phase Y-connected stator winding of the motor 10 as is shown in FIG. 2.

The inverter has six controlled rectifiers which can be called the power controlled rectifiers since they control the current flow through the phase windings of the three phase stator winding of the motor. These controlled rectifiers are designated by reference numerals 60a, 60b, 60c, 60d, 60e and 60f. The inverter also includes six shut-off controlled rectifiers 62a, 62b, 62c, 62d, 62e and 62f. The anodes of the shut-off controlled rectifiers 62d, 62e and 62f are connected with a common conductor 64. The cathodes of controlled rectifiers 62a, 62b and 62c are connected with a common conductor 66. It is seen that the shut-off controlled rectifiers are connected in series across conductors 66 and 64 and in series with the inductances 67, 68 and 70. The inverter has three shut-off capacitors 72, 74 and 76 connected respectively between junctions 54, 56 and 58 and a respective inductance.

The inverter includes shut-off power supplies designated respectively by reference numerals 78 and 80. Both of the shut-off power supplies are the same and therefore only one of them will be described. The shut-off supply 78 includes a source of direct current 78a, a resistor 78b, a capacitor 78c and a diode 78d. The diode is connected between common conductor 66 and a conductor connected with input terminal 50.

The operation of the inverter is such that pairs of power controlled rectifiers are turned on in a predetermined sequence to energize pairs of phase windings of the motor 10. Thus the sequence can be such that controlled rectifiers 60b and 60d are turned on simultaneously during one part of the cycle and with this arrangement, the phase windings 12 and 16 will be energized assuming that the input conductor 50 is positive. In another part of the cycle, for example, when controlled rectifiers 60a and 60e are turned on, the current flow is reversed through the phase windings 12 and 16. The arrangement is such that an alternating square wave is applied to the three phase winding of the motor to provide a rotating field within the motor. This is more fully described in copending application Ser. No. 295,954, filed on July 18, 1963 and now Pat. No. 3,323,032.

The capacitors 72, 74 and 76 are charged and discharged during the operation of the inverter 44 and when a shut-off controlled rectifier is fired, a given capacitor will discharge to reverse bias one of the power controlled rectifiers to turn it off. Thus, for example, when controlled rectifier 62a is fired during a predetermined part of the cycle, the capacitor 72 will discharge back biasing the controlled rectifier 60a to turn it off. This is more fully described in application Ser. No. 457,386, filed on May 20, 1965 and now Pat. No. 3,354,370.

Figure 3:
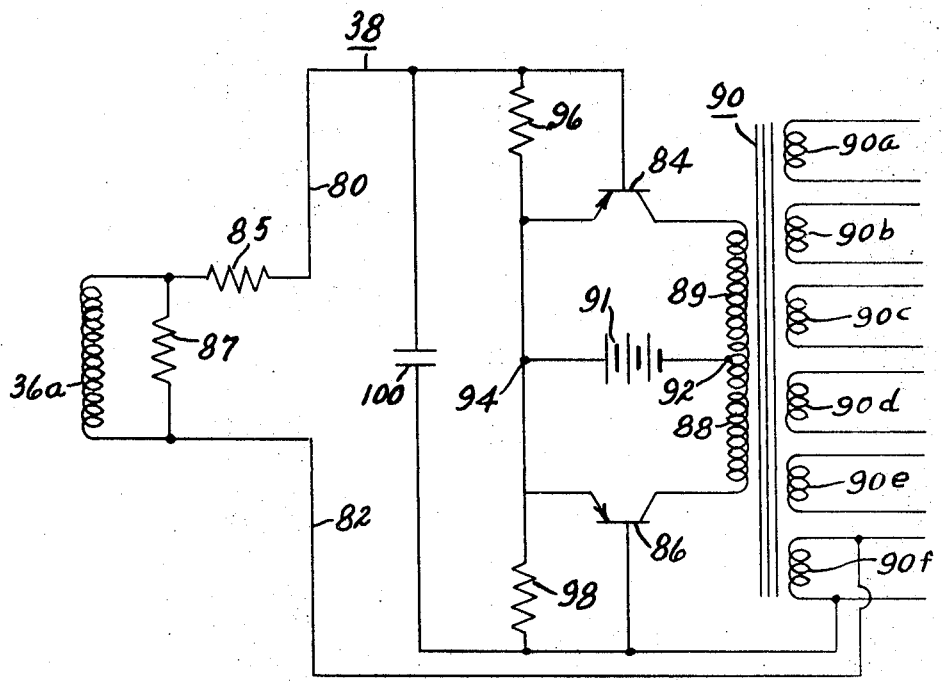
FIG. 3 is a schematic circuit diagram of a slow rise trigger circuit for supplying control signals to fast rise trigger circuits.

Referring now to FIG. 3, a schematic circuit diagram of the slow rise trigger circuit 38 shown in FIG. 1 is illustrated. The slow rise trigger circuit 38 is energized from one of the output windings 36a of the shaft and slip frequency control device 20. As was pointed out hereinbefore, three slow rise trigger circuits are required, but in the discussion to follow, only one of the slow rise trigger circuits will be described and this will be followed by a description of controlling only one of the six power controlled rectifiers and one of the six shut-off controlled rectifiers. The alternating current which is induced in winding 36a (see FIG. 3A) is applied to conductors 80 and 82 through a resistor 85 and a resistor 87 that is connected across the output winding of the generator 20. The conductors 80 and 82 are connected with a transistor oscillator that includes the PNP transistors 84 and 86. The collectors of transistors 84 and 86 are connected to opposite ends of primary windings 88 and 89 of a transformer 90. A source of direct current 91 is connected between the tap 92 and a junction 94. The junction 94 is connected with the emitters of transistors 84 and 86 and is connected with lines 80 and 82 through resistors 96 and 98. A capacitor 100 connects the base of transistor 86 with conductor 80 and this conductor is connected with the base of transistor 84.

The transformer 90 has a plurality of secondary windings 90a, 90b, 90c, 90d, 90e and 90f. These secondary windings are connected with the power fast rise triggers 40 and shut-off fast rise triggers 42 in a manner to be more fully described. It is seen that the secondary winding 90f is connected between the base of transistor 86 and conductor 82.

The transformer 90 is a saturating transformer and the transistors 84 and 86 are connected in a push-pull configuration across the primary windings of the transformer. The conduction of the transistors is controlled by the input voltage coming from the winding 36a of the generator 20. The voltage developed across secondary winding 90f provides positive feedback but the feedback loop is designed not to permit free running oscillations.

The function of the capacitor 100 is to exponentially reduce transistor base current as one of the transistors passes from its current saturated mode to its current limiting mode of operation. This capacitor in conjunction with resistor 85 is also part of an integrating circuit that reduces spurious input voltage pulses and attenuates the input signal as the frequency of the voltage developed in coil 36a is increased. This high frequency attenuation is necessary because the amplitude of the generator output signal increases as motor speed increases. The RC network of capacitor 100 and resistor 85 tends to maintain a constant R.M.S. signal current through the transistor bases regardless of motor shaft speed.

Figure 3A:
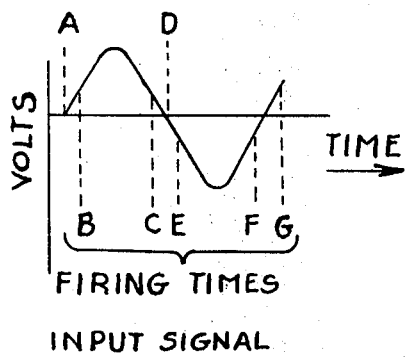
FIG. 3A is a curve illustrating the output voltage waveform applied to the circuit of FIG. 3.
Figure 3B:
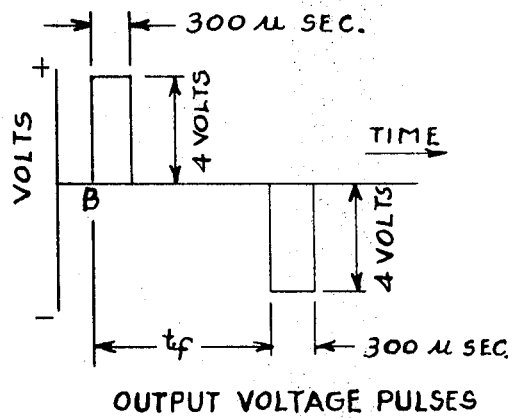
FIG. 3B is a curve of the output voltage of the circuit shown in FIG. 3.

The operation of the slow rise trigger circuit illustrated in FIG. 3 will now be described with reference to the curves shown in FIGS. 3A and 3B. The input voltage from winding 36a is depicted in FIG. 3A while the output voltage of the secondary windings of transformer 90 is depicted in FIG. 3B. When the input signal voltage of FIG. 3A is at point A, the generator output signal (winding 36a) is changing polarity. This reversal in current resets the core of transformer 90 and causes transistor 84 to turn on and transistor 86 to turn off. The instant the transformer is reset and transistor 84 starts to conduct, positive feedback voltage appears across secondary winding 90f driving transistor 84 further into conduction and speeding the switching off action of transistor 86. When the output signal reaches point B of FIG. 3A, transistor 84 is turned fully on and transistor 86 is turned fully off. Under this condition of operation, the voltage of battery 90 is impressed across the primary winding 89 and voltages are induced in the secondary windings of the transformer 90 as shown in FIG. 3B.

When point C is reached in the curve of FIG. 3A, the transistor 84 will remain switched on until the transformer saturates causing the output voltages of the secondary windings to drop to zero as shown in FIG. 3B. At this instant, the operating mode of transistor 84 changes from current saturated to current limiting. The capacitor 100 now discharges through the base of transistor 84 allowing collector current of this transistor to fall exponentially rather than instantaneously thus preventing ringing across the transformer secondary windings. The input signal current also flows through the base of transistor 84 and maintains a low level of base current after the capacitor 100 completely discharges. Just prior to the instant the signal current reverses polarity (point D), the transformer is saturated and no voltages appear across the secondary windings of the transformer. Thus, the battery voltage is supported across the collector to emitter resistance of transistor 84 and transistor 86 is held in the blocking state and also supports the battery voltage.

When the input voltage reaches point D on curve 3A, the reversal of polarity of the input signal resets the transformer core and cuts off transistor 84 and drives transistor 86 fully conductive. The switching action is again regenerative due to the reversed feedback voltage from secondary winding 90f in series with the signal voltage.

When point E is reached on the input signal voltage curve of FIG. 3A, a pulse of voltage of an opposite polarity is developed across the secondary windings as is depicted in FIG. 3B. The length of this pulse is again determined by the time required for the transformer to saturate. Transistor 86 is then held in the conductcing state by the discharge of capacitor 100 and the input signal current until the signal polarity is reversed causing transistor 84 to conduct again and the cycle repeats itself.

From the foregoing, it will be appreciated that direct current pulses of opposite polarity and constant amplitude as shown in FIG. 3B are developed in the secondary windings of the transformer 90 as the input voltage varies in accordance with the curve of FIG. 3A. The frequency of the output voltages is determined by the input frequency of the voltage appearing across winding 36a.

The voltages developed across the six secondary windings of the transformer 90 are used to trigger the power fast rise triggers 40 and the shut-off fast rise triggers 42. It is pointed out that there will be three circuits of the type shown in FIG. 3 required and therefore there will be 18 secondary windings capable of applying control pulses to the triggers 40 and 42. These secondary windings must be connected with the triggers 40 and 42 in such a manner that the correct sequence is provided for firing the power controlled rectifiers and shut-off controlled rectifiers of the inverter 44. In this regard, it is to be noted that six power fast rise triggers 40 are required and six shut-off fast rise triggers 42 are required in order to properly sequence the inverter 44. In order to simplify the description of this invention, however, only one fast rise trigger 40 will be described controlling only one power controlled rectifier and only one shut-off fast rise trigger 42 will be described for controlling one shut-off controlled rectifier.

Figure 5:
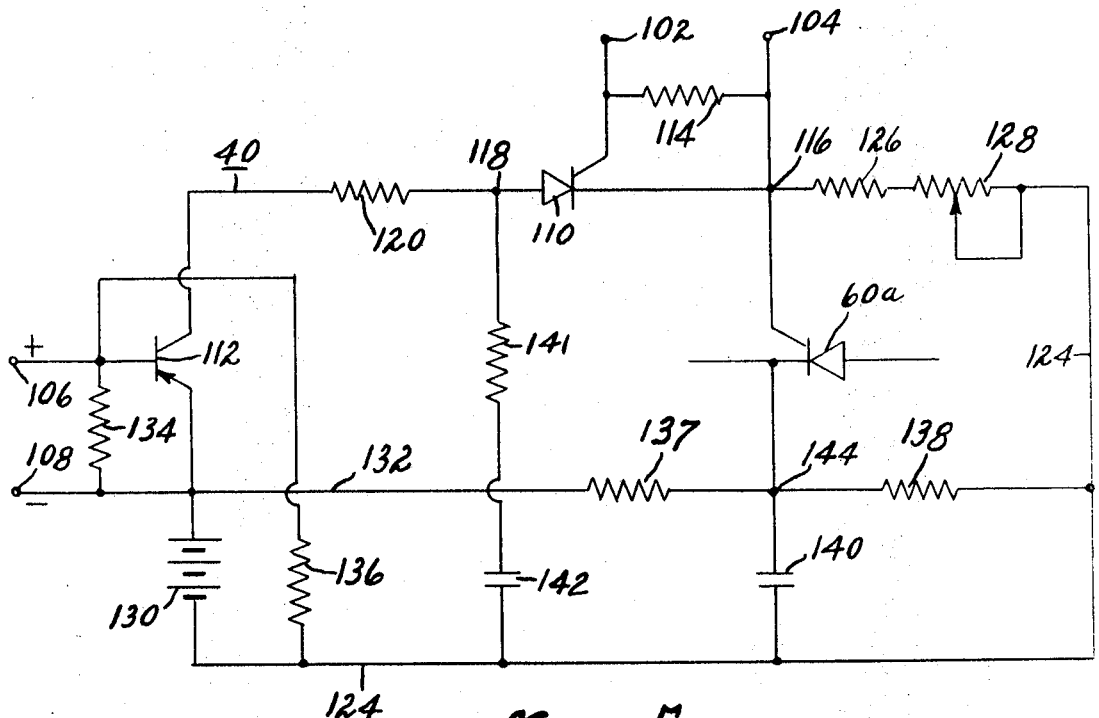
FIG. 5 is a schematic circuit diagram of a fast rise trigger circuit for controlling the power controlled rectifiers of the inverter.

Referring now to FIG. 5, one of the power fast rise trigger circuits 40 is illustrated. It is assumed that this trigger circuit is controlling the controlled rectifier 60a which will be connected in the inverter in a manner shown in FIG. 2. The trigger circuit 40 includes input terminals 102 and 104 which provide a turn-on trigger supply for the controlled rectifier 60a. This circuit has two other input terminals 106 and 108 which receive a signal which is also supplied to the shut-off triggers 42. The terminals 102 and 104 and 106 and 108 will be connected with selected secondary windings of the transformer 90 and in the proper sequence to control the inverter 44.

The trigger circuit 40 includes a controlled rectifier 110 and a PNP transistor 112. The gate of controlled rectifier 110 is connected with input terminals 102 and a resistor 114 is connected across the input terminals 102 and 104. The cathode of controlled rectifier 110 is connected with junction 116 while the anode of controlled rectifier 110 is connected with junction 118. The junction 118 is connected with the collector of transistor 112 through resistor 120. The junction 116 is connected with power input conductor 124 through a fixed resistor 126 and an adjustable resistor 128. The conductor 124 is connected to one side of a source of direct current 130 the opposite side of this source being connected with conductor 132. The emitter of transistor 112 is connected with conductor 132 and a resistor 134 connects the emitter and base of transistor 112. A resistor 136 is connected between the base of transistor 112 and conductor 124. The emitter of transistor 112 is also connected with conductor 124 through resistors 137 and 138. A capacitor 140 is connected across resistor 138.

A series connected resistor and capacitor 141 and 142 connect conductor 124 and the junction 118.

The cathode of controlled rectifier 60a which is one of the inverter power supply controlled rectifiers is connected with junction 144.

With no signal input to terminals 102 and 104, the controlled rectifier 60a is biased off. In this condition of operation, the transistor 112 is biased to a conductive condition since base current can flow in this transistor. When a signal of the proper polarity coming from one of the secondary windings of the transformer 90 is applied across input terminals 102 and 104, the controlled rectifier 110 will be biased to a conductive condition. When the controlled rectifier 110 turns on, the capacitor 142 will discharge through the gate of the controlled rectifier 60a turning this controlled rectifier on. After capacitor 142 discharges through controlled rectifier 110 and the gate-cathode circuit of controlled rectifier 60a, a sustaining current for holding controlled rectifier 60a on flows from direct current source 130, through the emitter-collector circuit of transistor 112, through resistor 120, through the trigger controlled rectifier 110 and then to the gate-cathode circuit of the power controlled rectifier 60a and resistor 138. It therefore is seen that as long as transistor 112 is conducting, the power controlled rectifier 60a will remain turned on and this is important where the power being supplied to this controlled rectifier across input terminals 50 and 52 of FIG. 2 is of the pulsating direct current type as is supplied by a pulse modulator. Thus, if the controlled rectifier 60a were not latched on by the circuit including transistor 112 and if the system were supplied by a pulse modulator, the controlled rectifier 60a might turn off prematurely which is not desired in this system. By the use of this latching circuit, it is possible to hold the controlled rectifier 60a on for a full 120° conduction angle even though the inverter is being supplied by a pulse modulator.

As the output voltage of the secondary windings of transformer 90 varies, a signal eventually is applied across input terminals 106 and 108 of the trigger circuit in FIG. 5 which will drive the base of transistor 112 positive with respect to its emitter. This will cause the transistor 112 to turn off in its emitter-collector circuit which turns off the trigger controlled rectifier 110 and the power controlled rectifier 60a. Thus when transistor 112 turns off, the latching circuit for controlled rectifier 60a is broken and this controlled rectifier therefore turns off.

The above described sequence of events repeats itself over a given cycle of operation to hold controlled rectifier 60a on for a predetermined length of time as determined by the input signal voltage shown in FIG. 3A. The controlled rectifier 60a remains on even when the output voltage of the pulse modulator goes to zero due to the provision of the latching circuit.

Figure 4:
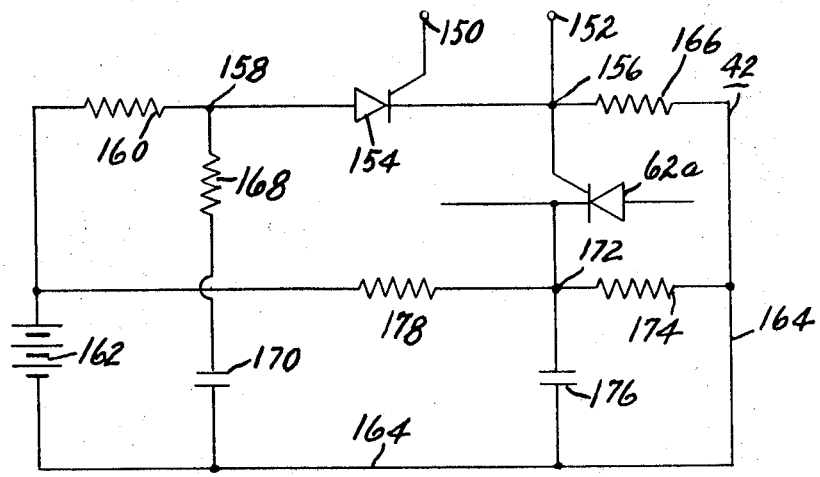
FIG. 4 is a schematic circuit diagram of a fast rise trigger circuit for controlling the shut-off controlled rectifiers of the inverter that supplies the electrical load of the system shown in FIG. 1.

The shut-off fast rise trigger circuit 42 is illustrated in FIG. 4 and will now be described. This trigger circuit controls one of the shut-off controlled rectifiers, for example, controlled rectifier 62a. The trigger circuit of FIG. 4 has input terminals 150 and 152 which are connected with one of the selected secondary windings of a transformer 90. The trigger circuit of FIG. 4 includes a trigger controlled rectifier 154 having its gate connected with input terminal 150 and having its cathode connected with junction 156. The anode of controlled rectifier 154 is connected with junction 158. A resistor 160 is connected between junction 158 and one side of a source of direct current 162. The opposite side of the source of direct current is connected with conductor 164 and a resistor 166 is connected between this conductor and junction 156.

A series connected resistor and capacitor 168 and 170 are connected between junction 158 and conductor 164.

The gate of the shut-off controlled rectifier 62a is connected with junction 156 while its anode and cathode will be connected as shown in FIG. 2. The cathode of controlled rectifier 62a is connected with junction 172 and a resistor 174 connects this junction with conductor 164. A capacitor 176 is connected across resistor 174 while a resistor 178 connects the positive side of the direct current source 162 and junction 172.

In describing the operation of the trigger circuit shown in FIG. 4, it will be appreciated that the controlled rectifier 154 is normally not conductive and that the controlled rectifier 62a is biased to a nonconductive condition. When a trigger pulse of the proper polarity is applied to input terminals 150 and 152 from one of the secondary windings of one of the transformers 90, the trigger controlled rectifier 154 is biased to a conductive condition. The capacitor 170 which was previously charged from direct current source 162 now discharges through the anode-cathode circuit of controlled rectifier 154 and through the gate cathode circuit of controlled rectifier 62a. This turns the controlled rectifier 62a on in its anode-cathode circuit to provide a discharge path for one of the capacitors in the inverter 44 to shut-off one of the power controlled rectifiers. After capacitor 170 discharges, the resistor 160 functions to limit the current for the trigger controlled rectifier 154 below the holding current for this controlled rectifier to cause it to turn off and provides a charge path for capacitor 170 during the interval between pulses applied across input terminals 150 and 152.

The circuit of FIG. 4 applies extremely fast rise current pulses to the gate of the controlled rectifier 62a thereby maximizing $dI/dt$ capabilities of the controlled rectifier. The triggering circuit of FIG. 4 also maintains a negative bias on the gate of the controlled rectifier 62a during the interval between trigger pulses applied to input terminals 150 and 152 thereby improving the $dv/dt$ capabilities of the device. In addition, the circuit of FIG. 4 utilizes the holding current characteristics of the trigger controlled rectifier 154 to reset the trigger circuit.

The fast rise characteristic of the circuit of FIG. 4 is important because it provides more uniform current density in the area immediately surrounding the gate connection of the controlled rectifier 62a during the inrush of anode current and also reduces the turn-on dissipation of the gate junction.

The capacitor 176 functions as a bypass capacitor. The resistor 174 and capacitor 176 could be replaced by a Zener diode if desired.

To summariaze the operation of the electrical system that has been described, it will be appreciated that the power controlled rectifiers 62a through 62f of the inverter 44 are controlled in a predetermined sequence so that pairs of phase windings of the motor 10 are energized sequentially to provide a rotating magnetic field for the motor. The signal information for controlling the inverter is developed by the slow rise trigger circuit 38 which is shown in FIG. 3 and which includes the secondary windings of the transformer 90. The signals developed by the slow rise trigger circuit 38 are selectively connected with the trigger circuits 40 and 42 to properly sequence the operation of the inverter.

With the system that has been described, fast rise trigger circuits are used for both the power controlled rectifiers and the shut-off controlled rectifiers of the inverter and a latching circuit is used in the trigger circuits 40 so that the system can operate efficiently where the inverter is fed by a pulse modulator.

Although fast rise trigger circuits have been disclosed for driving the inverter, the inverter can be driven directly from the slow rise trigger circuit where the inverter uses controlled rectifiers in which $di/dt$ and $dv/dt$ are not critical. In such an arrangement, each slow rise trigger circuit output transformer would require only four sets of trigger leads, that is, two for each power controlled rectifier and two for each shut-off controlled rectifier.

While the embodiments of the present invention as herein disclosed constitute a preferred form, it is to be understood that other forms might be adopted.

What is claimed is as follows:

1. An electrical system for providing an alternating substantially square wave control signal the frequency of which is a function of the speed of rotation of a rotatable element comprising, an alternating current generator having an output winding and a part driven by said rotatable element, first and second transistors each having an emitter, collector and base, a saturable transformer having first and second primary windings and at least one secondary winding, a source of direct current, means connecting said source of direct current, the emitter-collector circuit of said first transistor and said first primary winding in series, means connecting said source of direct current, the emitter-collector circuit of said second transistor and said second primary winding in series, a resistor connecting one end of said output winding with the base of said first transistor, means connecting the other end of said output winding with one side of said secondary winding, means connecting the opposite side of said secondary winding with the base of said second transistor, and a capacitor connected between the end of said resistor that is connected to the base of said first transistor and the base of said second transistor, said transformer being driven to a saturated condition when a respective transistor is biased conductive.

2. A pulse shaping circuit for converting a substantially sinusoidal alternating current input signal to substantially square wave opposite polarity output pulses comprising, input terminals adapted to be connected with an alternating current signal, a saturable transformer having first and second primary windings and at least one secondary winding, a source of direct current, first and second transistors, means connecting said transistors, said source of direct current and said primary windings in a push-pull circuit configuration, means connecting the base electrodes of said transistors with said input terminals, a feedback circuit connecting the base electrodes of said transistors with said secondary winding, said transformer being periodically driven to saturation at a predetermined time after a transistor is biased conductive, and a capacitor connected between the base electrodes of the first and second transistors.

3. An electrical pulse shaping circuit for converting a substantially sinusoidal alternating current input signal to a substantially square wave output comprising, a pair of input terminals adapted to be connected with said alternating current signal, a saturable transformer having a plurality of secondary windings and first and second primary windings, a source of direct current, first and second transistors, means connecting the emitter and collector electrodes of said transistors in series with said source of direct current and with a respective primary winding, means connecting the base electrodes of said transistors with said input terminals and with one of said secondary windings, said transformer being driven to saturation when a respective transistor is biased conductive by said alternating current signal, and a resistor-capacitor integrating circuit connected with the input terminals.

References Cited
UNITED STATES PATENTS

| | | |
|---|---|---|
| 2,785,236 | 3/1957 | Bright et al. |
| 2,862,171 | 11/1958 | Freeborn _____ 321—45 |
| 3,067,378 | 12/1962 | Paynter _____ 321—45 XR |
| 3,098,958 | 7/1963 | Katz _____ 318—138 |
| 3,153,185 | 10/1964 | Hummel _____ 318—138 XR |
| 3,242,405 | 3/1966 | Ikegami _____ 318—254 XR |
| 3,244,959 | 4/1966 | Thompson et al. _ 331—113.1 XR |

WILLIAM M. SHOOP, JR., Primary Examiner

U.S. Cl. X.R.
331—113